United States Patent [19]
Williams, Jr.

[11] Patent Number: 6,038,426
[45] Date of Patent: Mar. 14, 2000

[54] SYSTEM AND METHOD FOR SECURING A REMOVABLE SEAT ELECTRONICS UNIT WITHOUT DETACHMENT OF THE COMMUNICATION CABLE

[75] Inventor: Howard A. Williams, Jr., Corona, Calif.

[73] Assignees: Sony Corporation, Tokyo, Japan; Sony Trans Com, Inc., Irvine, Calif.

[21] Appl. No.: 08/702,938

[22] Filed: Aug. 26, 1996

[51] Int. Cl.⁷ .............................. H04H 1/02; H04N 7/10
[52] U.S. Cl. ................................ 455/6.2; 348/8; 348/10
[58] Field of Search .............................. 455/3.1, 3.3, 4.1, 455/4.2, 5.1, 6.1, 6.2, 6.3; 348/6, 10, 7, 12, 13, 8

[56] References Cited

U.S. PATENT DOCUMENTS

| | | | |
|---|---|---|---|
| 3,795,771 | 3/1974 | Gunderson et al. | 179/15 |
| 4,647,980 | 3/1987 | Steventon et al. | 358/254 |
| 4,763,360 | 8/1988 | Daniels et al. | 455/3 |
| 4,774,514 | 9/1988 | Hildebrandt et al. | 340/971 |
| 4,835,604 | 5/1989 | Kondo et al. | 358/86 |
| 4,853,555 | 8/1989 | Wheat | 307/9.1 |
| 4,866,515 | 9/1989 | Tagawa et al. | 358/86 |
| 4,896,209 | 1/1990 | Matsuzaki et al. | 358/86 |
| 4,897,714 | 1/1990 | Ichise et al. | 358/86 |
| 4,975,696 | 12/1990 | Salter, Jr. et al. | 340/973 |
| 5,214,505 | 5/1993 | Rabowsky et al. | 358/86 |
| 5,220,419 | 6/1993 | Sklar et al. | 358/86 |
| 5,289,272 | 2/1994 | Rabowsky et al. | 348/8 |
| 5,311,302 | 5/1994 | Berry et al. | 379/14 |
| 5,347,632 | 9/1994 | Filepp et al. | 395/200 |
| 5,404,567 | 4/1995 | DePietro et al. | 455/6.3 |

(List continued on next page.)

OTHER PUBLICATIONS

"MDSS id Here!", Unlisted, *Digital Video News* Jul. 1995.
"Optibase & BEA Make MPEG Fly!", Unlisted, *Digital Video News* Jul. 1995.
"Flying Those Interactive Skies", Morris, *TV Technology* Oct. 1995.
"Video–On–Demand Trail Starts on Alitalia Airlines Other Airplane Tests Have Same Maddening Delays as Cable/Telco Trials", Unlisted, *European Media Business & Finance* Nov. 3, 1995.
"BE Aerospace Interactive Video System Successfully Debuts on British Airways B747; Company Awarded $33 Millon in New Seating Programs" Unlisted, *Business Wire* Nov. 21, 1995.
"TNCi Continues Airview(TM) Enhancement with Telephone Interface", Unlisted, *PR Newswire* Nov. 28, 1995.
"First Totally Digitalized In–Flight Entertainment System to be Introduced on International Carrie—Alitalia; IFT System will Debut on Rome to Chicago Flight Dec. $1^{st}$", Unlisted, *Business Wire* Nov. 30, 1995.
"TNC to Put Internet Service into its IFE", Unlisted, *In–Flight Entertainment* , Jan. 1996.
"Two–Way Street", Harboson & Dunn, *Inflight* Mar. 1996.
"Airframers Force Discipline in High–Stakes IFE Market", Velocci, *Aerospace Business* Mar. 25, 1996.
"Interactive Flight Technologies Signs Agreement with Swissair; IFT to Install In–Flight Entertainment System, Complete with Casino–Style Gambling, On All 21 of its Long–Haul Jets", Unlisted, *Business Wire* May 2, 1996.
The Network Connection Announces Hiper Cheetah—300 Simultaneous Video Streams, Unlisted, *PR Newswire* Jun. 7, 1996.

*Primary Examiner*—John W. Miller
*Attorney, Agent, or Firm*—Blakely, Sokoloff, Taylor & Zafman LLP

[57] ABSTRACT

A seat electronics unit ("SEU") designed for quick and easy replacement. The SEU includes a line-replaceable SEU providing control over telephony and in-flight entertainment associated with a group of passenger seats, and a receiver adapted to receive the line-replaceable SEU. The receiver is attached to one of the group of passenger seats and operates as an interface between the line-replaceable SEU and a plurality of communication cables propagating the telephony and in-flight entertainment. The receiver is configured to allow the line-replaceable seat electronics unit to be removed without removal of the communication cables.

38 Claims, 5 Drawing Sheets

U.S. PATENT DOCUMENTS

| | | | |
|---|---|---|---|
| 5,414,455 | 5/1995 | Hooper et al. | 348/7 |
| 5,442,390 | 8/1995 | Hooper et al. | 348/7 |
| 5,529,265 | 6/1996 | Sakurai | 244/118 |
| 5,539,448 | 7/1996 | Verhille et al. | 348/6 |
| 5,555,466 | 9/1996 | Scribner et al. | 348/8 |
| 5,557,541 | 9/1996 | Schulhof et al. | 364/514 |
| 5,568,180 | 10/1996 | Okamoto | 348/7 |
| 5,568,181 | 10/1996 | Greenwood et al. | 348/7 |
| 5,568,484 | 10/1996 | Margis | 370/85.5 |
| 5,572,442 | 11/1996 | Schulhof et al. | 455/4.2 |
| 5,586,937 | 12/1996 | Menashe | 463/41 |
| 5,596,647 | 1/1997 | Wakai et al. | 381/77 |
| 5,608,447 | 3/1997 | Farry et al. | 348/7 |
| 5,608,448 | 3/1997 | Smoral et al. | 348/7 |
| 5,612,730 | 3/1997 | Lewis | 348/12 |
| 5,631,693 | 5/1997 | Wunderlich et al. | 348/7 |

SYSTEM AND METHOD FOR SECURING A REMOVABLE SEAT ELECTRONICS UNIT WITHOUT DETACHMENT OF THE COMMUNICATION CABLE

BACKGROUND OF THE INVENTION

1. Field of the Invention

The present invention relates to the field of in-flight entertainment systems. More particularly, the present invention relates to a seat electronics unit and corresponding replacement technique designed to reduce the amount of time required for removal and/or installation of the seat electronics unit.

2. Description of Art Related to the Invention

Figure 1:
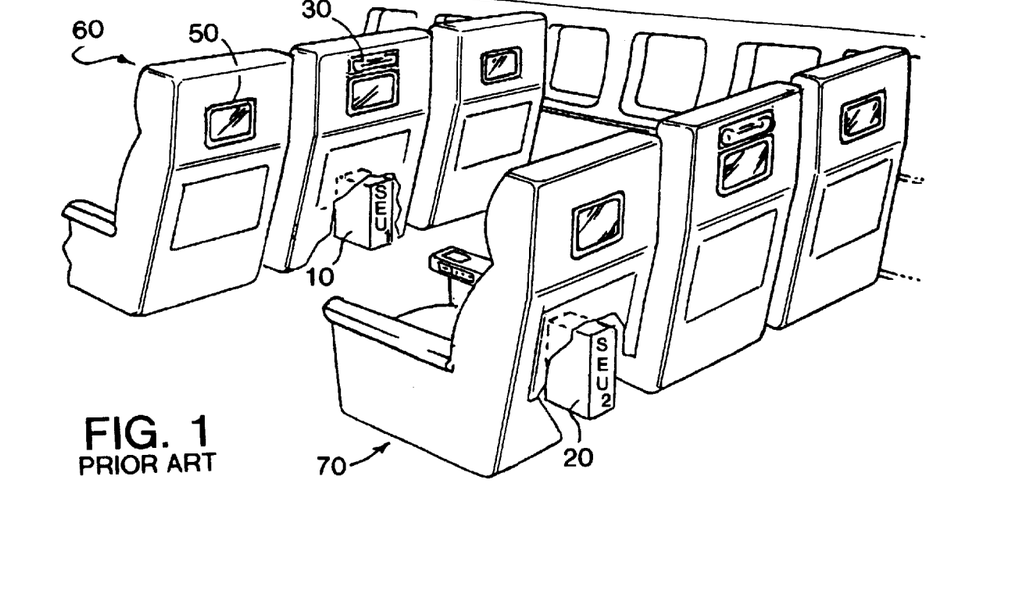
FIG. 1 is an exploded perspective view of a typical passenger aisle of a commercial aircraft in which each passenger is provided telephony and in-flight entertainment activities through separate seat electronics units ("SEUs").

Over the last few decades, commercial aircraft has become a necessary mode of travel for personal and business reasons. In order to improve passenger comfort, many commercial airlines now offer on-board telephony as well as in-flight entertainment such as video games, pay-per-view movies, hotel reservations services, and the like. These telephony and entertainment services are controlled by a plurality of seat electronics units "SEUs" as shown in FIG. 1.

Typically, a first SEU ("$SEU_1$") 10 is used to control the transfer of information between a telephone handset 30 and telephony transmitter/receiver circuitry (not shown) in order to establish and maintain audio-based communications with a telephone remotely located from the aircraft. A second SEU ("$SEU_2$") 20 is connected to a number of hand-held control units (e.g., control unit 40) and their corresponding liquid crystal displays ("LCD") 50, mounted onto the back of one of a group of passenger seats 60 as shown, or to an armrest of the passenger seat. $SEU_2$ 20 receives control signals from each handheld control unit of passenger seats 70 to signal other electronic devices to provide video content (e.g., movies) for display on its associated LCD or to select a menu representing one of a number of in-flight entertainment activities. Both of these SEUs 10 and 20 include electrical circuitry encapsulated within its protective cover.

Figure 2:
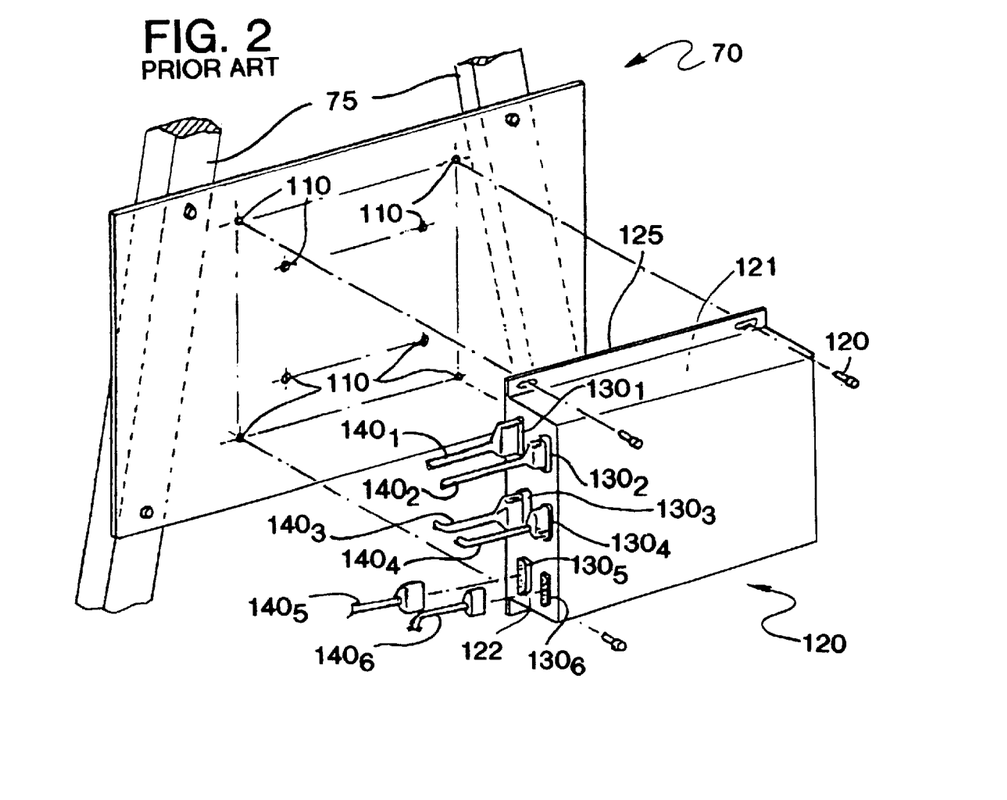
FIG. 2 is a perspective view of a conventional technique for mounting a SEU to the legs of one of a group of passenger seats.

Referring to FIG. 2, each SEU ($SEU_2$ 20 for example) is connected to a pair of legs 75 of one of the passenger seats 70 by mounting hardware. The mounting hardware includes a mounting plate 100 with a number of pre-drilled mounting holes 110 arranged in a predetermined pattern. This pattern enables the mounting plate 100 to support a variety of SEU sizes provided by different original equipment manufacturers ("OEMs"). Bolts 120 are inserted through a flange element 125 of the SEU and mounting holes 110 of the mounting plate, and subsequently secured by hexagonal nuts (not shown). As a result, the SEU is secured to the mounting plate 100 and the flange element 125, adjacent to a first lateral side 121 of a protective cover 120 of the SEU, rests flush against the mounting plate 100.

A plurality of communication connectors $130_1$–$130_m$ ("m" being a positive whole number), normally multiple-pin female connectors, are implemented on a back side 122 of the protective cover 120. Collectively, as shown, connectors $130_1$–$130_6$ provide an electrical interface so that information can be transferred into or from the SEU via communication cables $140_1$–$140_6$. Of course, the communication cables $140_1$–$140_6$ are mechanically and electrically adaptive to connectors $130_1$–$130_6$.

Over the last few years, it has been determined that the conventional SEU architecture possesses a number of disadvantages. One disadvantage involves design inflexibility in which the mounting plate is incapable of accommodating a variety of seat designs and SEU sizes. Another disadvantage is that it is time consuming to remove a conventional SEU for any number of reasons (e.g., scheduled servicing, repair after becoming completely or partially nonfunctional, etc.) as well as to install a SEU. More specifically, in order to remove the SEU, the communication cables $140_1$–$140_6$ would be initially disconnected from the SEU. After disconnecting the communication cables $140_1$–$140_6$, the bolts 120 are loosened and removed from the mounting holes 110 of the mounting plate 100. This allows the SEU to be disconnected from the mounting plate 100 and subsequently substituted with another SEU or repaired and reinstalled. Conversely, in order to install a new or repaired SEU, it is re-connected to the mounting plate 100 by re-attaching the bolts 120 and the communication cables $140_1$–$140_6$.

The replacement technique associated with the conventional SEU architecture clearly is labor intensive. This creates havoc with flight schedules because, if a few SEUs need to be replaced, it may result in aircraft downtime and subject commercial airline passengers to long flight delays. Such delays further increase maintenance costs creating an adverse tradeoff between maintenance costs and customer satisfaction. This tradeoff would pose adverse financial effects on the commercial airline. Moreover, this replacement technique may indirectly cause additional installation problems if the repair person accidentally damages a connector upon disconnecting and re-connecting its communication cable, mistakenly leaves the cables unconnected or improperly connected, and other related problems.

Therefore, it would be advantageous to develop a SEU and corresponding replacement technique which overcomes the above-identified disadvantages.

SUMMARY OF THE INVENTION

The present invention relates to a seat electronics unit ("SEU") comprising (i) a line-replaceable seat electronics unit providing control over telephony and in-flight entertainment associated with a group of passenger seats, and (ii) a receiver adapted to receive the line-replaceable seat electronics unit and operate as an interface between the line-replaceable seat electronics unit and a plurality of communication cables propagating the telephony and in-flight entertainment. The receiver is configured to allow the line-replaceable seat electronics unit to be removed without removal of the communication cables. This allows the line-replaceable seat electronics unit to be quickly and easily replaced.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to as easily removable seat electronics unit ("SEU") comprising a receiver permanently attached to the passenger seat of a mass transit vehicle. Herein, a number of illustrative embodiments are described in order to convey the spirit and scope of the present invention. While certain specific details are set forth to describe the preferred embodiment of the invention, such details may not be required to practice the present invention.

In the detailed description, a number of terms are frequently used to describe certain circuitry implemented within a commercial aircraft. For example, the term "line-replaceable" defines that a device can be easily replaced, normally due to the implementation of plug-in connector pairs. A "seat electronics unit" (SEU) is circuitry used to control the propagation of information, such as telephony and in-flight entertainment, into input/output ("I/O") devices (e.g., display, passenger control unit) of a group of passenger seats, or from another SEU serially connected to the SEU. A "passenger control unit" (PCU) is circuitry preferably implemented in an armrest of a passenger seat to at least provide information to circuitry on-board the aircraft to perform various functions (e.g., activating or deactivating a reading light, calling a flight attendant, audio volume control, etc.) and provide audio to the passenger. Embodiments of the PCU are set forth in a co-pending U.S. patent application entitled "An integrated Electronic System Utilizing A Universal Interface to Support Telephony and Other Communication Services", filed Apr. 25, 1996 (application Ser. No. 08/639,287), owned by Assignee of the present invention and incorporated herewith by reference.

Figure 3:
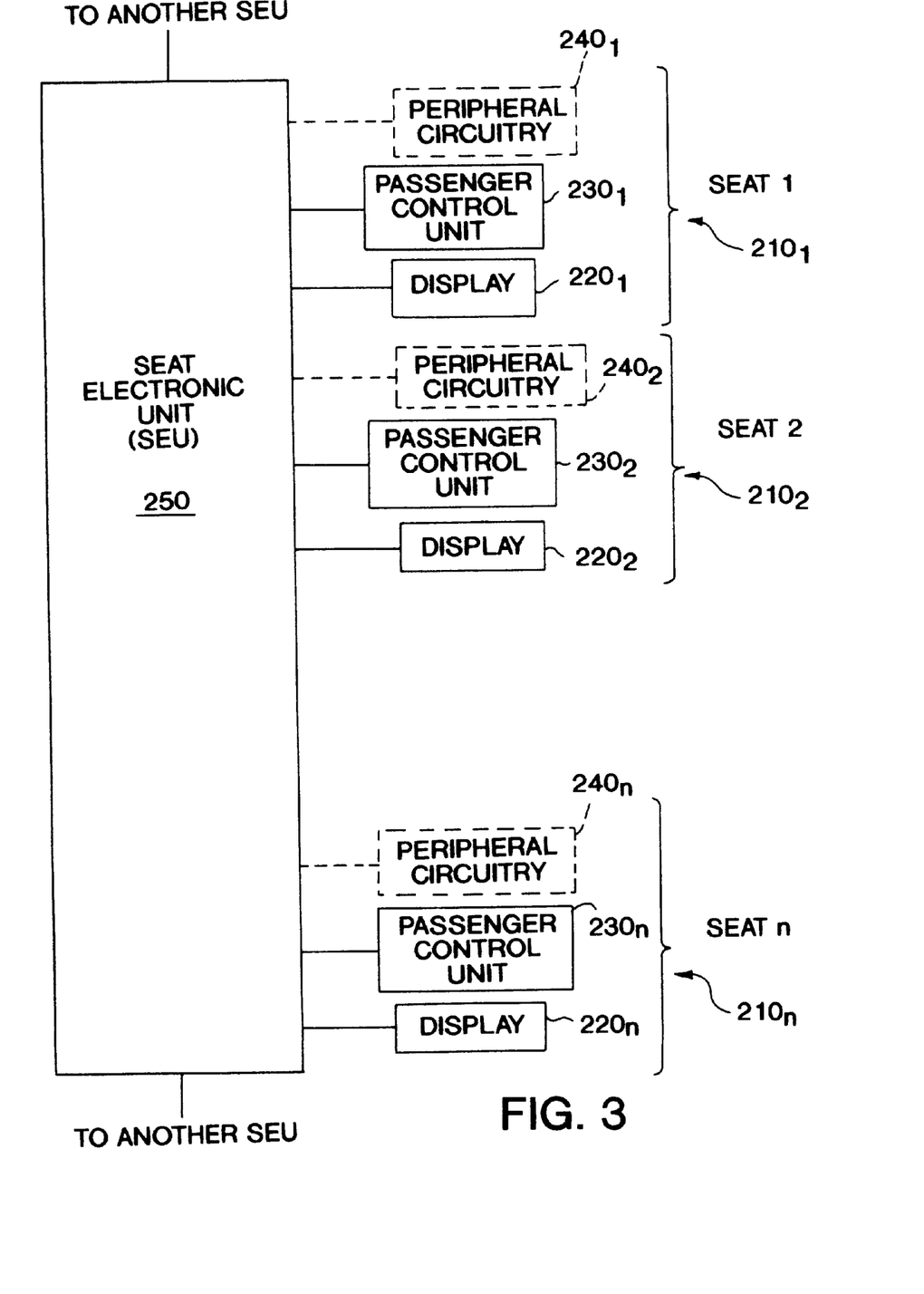
FIG. 3 is an illustrative block diagram of a portion of an in-flight entertainment system that utilizes a number of line-replaceable SEUs in which each line-replaceable SEU controls multiple passenger control units pertaining to a group of passenger seats.

Referring to FIG. 3, a simplified block diagram of electronic circuitry 200 associated with a group of "n" passenger seat(s) $210_1$–$210_n$ ("n" being a positive whole number) on a mass transit vehicle (e.g., a ferry, train, bus, commercial aircraft, etc.) is shown. The electronic circuitry 200 includes a seat electronics unit ("SEU") 250 controlling telephony and in-flight entertainment activities associated with passenger seats $210_1$–$210_n$. Preferably, the SEU 250 is coupled in series with other SEUs to reduce the amount of cabling required. However, it is contemplated that other network topologies may be utilized. As shown, the SEU 250 is coupled to a number of peripherals including displays $220_1$–$220_n$, passenger control units ("PCUs") $230_1$–$230_n$, and possibly peripheral circuitry $240_1$–$240_n$ supporting a modem connector (e.g., RJ-11 connector) or head phone connector, provided one or both of these connectors are not supported by the PCUs $230_1$–$230_n$. It is contemplated that each of the displays $220_1$–$220_n$ is preferably a flat panel display including, but is not limited to, a liquid crystal display "LCD", an active matrix display and the like, although other types of displays may be used such as CRTs or a goggle type LCD, for example, Glastron™ of Sony Corporation (Japan).

As further shown in FIG. 3, each passenger seat $210_1$–$210_n$ is uniquely assigned to at least a display $220_1$–$220_n$ and PCU $230_1$–$230_n$, respectively. Based on input signals from the PCU $230_1$–$230_n$ or its associative peripheral circuitry $240_1$–$240_n$ (if implemented), the SEU 250 performs operations on the input and responds appropriately (e.g., sends signals to on-board telephony circuitry to place a call, alter images displayed or a menu selection on the display and the like). The SEU 250 is usually mounted under one of the group of passenger seats $210_1$ . . . or $210_n$ as shown in FIGS. 4–6.

Figure 4:
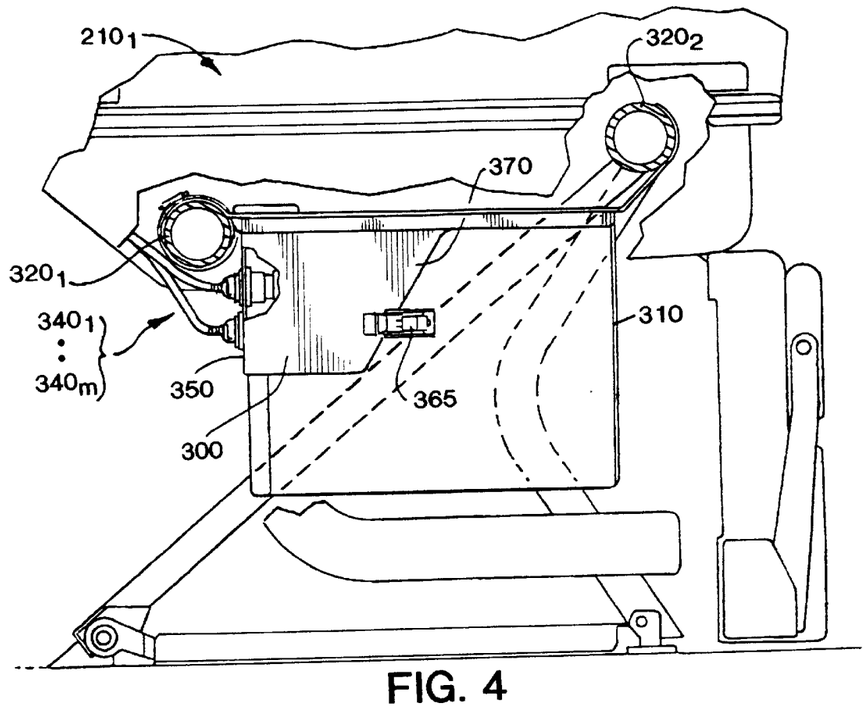
FIG. 4 is a perspective view of one embodiment of the present invention in which the line-replaceable SEU is coupled to a pre-installed, vertically mounted SEU receiver to form the SEU.

Referring now to FIG. 4, a preferred embodiment of the present invention is shown. The SEU comprises a receiver 300, operating as a housing, and a line-replaceable SEU 310 which is removably coupled to the receiver 300. The receiver 300 is supported by structural supports of a seat by any conventional means. One type of structural support is one or more torque seat tubes (e.g., torque seat tubes $320_1$ and $320_2$), which are normally oriented horizontally through the passenger seats $210_1$–$210_n$, including passenger seat $210_1$ as shown. A plurality of communication cables $340_1$–$340_m$ are connected to a backplane 350 of the receiver 300. The line-replaceable SEU 310 is removably connected, both mechanically and electrically, to the backplane 350. Additionally, the line-replaceable SEU 310 is secured to remain in close proximity to the receiver 300 by a fastener 365 (e.g., a spring latch having first and second latch elements) mounted on a first side 370 of the receiver 300 and a corresponding side of the line-replaceable SEU 310. Removal of the line-replaceable SEU 310 is achieved by releasing the fastener 365 and pulling in a direction perpendicular to the torque seat tubes $320_1$ and $320_2$. Other embodiments for the fastener 365 are contemplated, such as a belt and buckle combination or a track mechanism in which the receiver 300 provides a track on one of its sides and the line-replaceable SEU 310 is connected to the track. The line-replaceable SEU 310 may be slid along to the track to be locked into place or unlocked for removal from the track.

Figure 5:
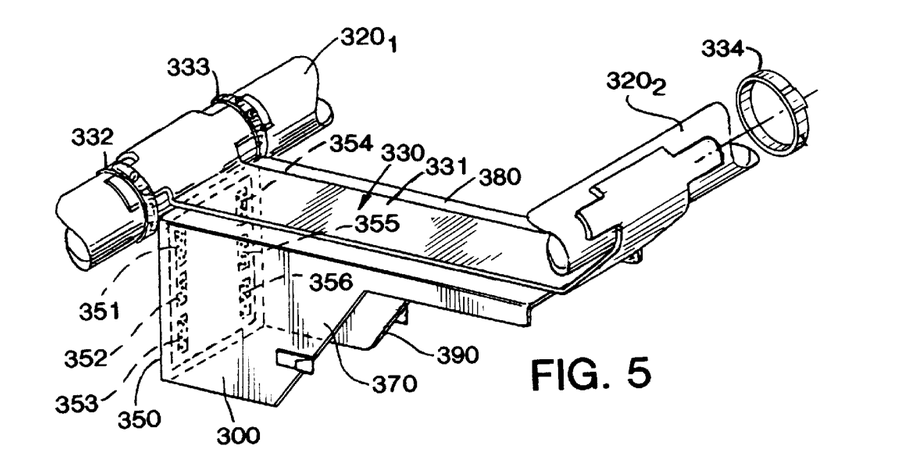
FIG. 5 is a perspective view of the receiver of FIG. 4.
Figure 6:
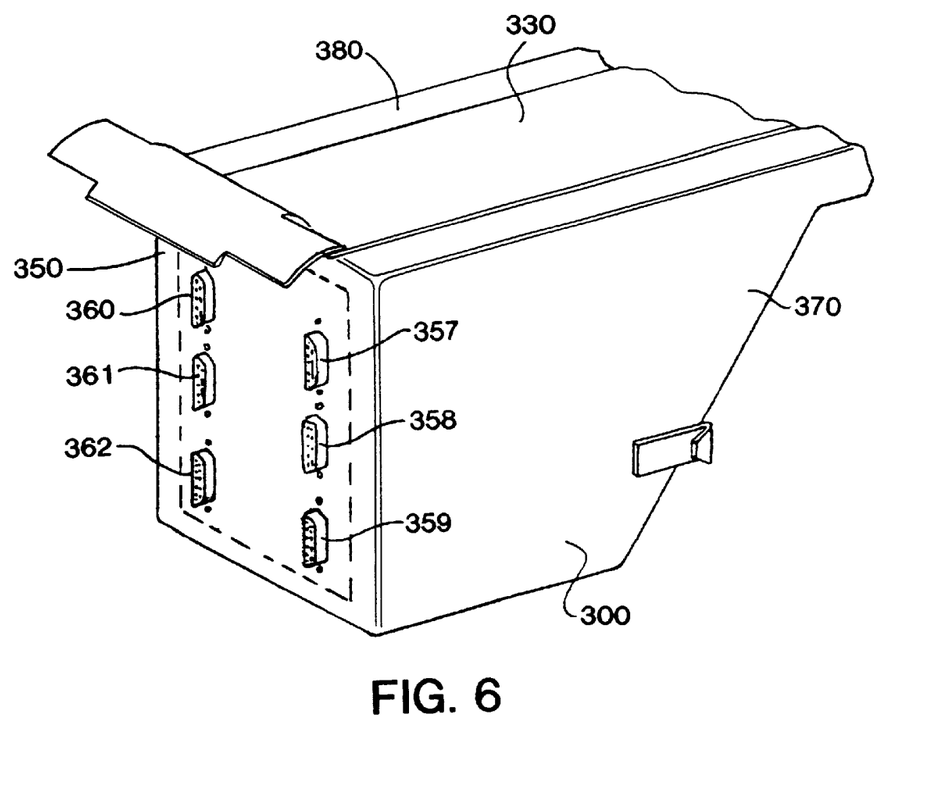
FIG. 6 is a perspective view of a backplane of the receiver of FIGS. 4–5.

Referring now to FIG. 5, a more detailed view of the receiver 300 is shown. The receiver 300 includes the backplane 350 surrounded by the first side 370, a second side 380 and a third side 390. As shown, the second side 380 of the receiver 300 is coupled to one or more of the torque seat tubes $320_1$ and $320_2$ by a mounting device 330 including, but not limited to, a stabilizing bar 331 and one or more brackets (e.g., brackets 332–334), clamped around the torque seat tubes $320_1$ and $320_2$. The brackets 332–334 include isolation foam (not shown) along its inner surface in contact with the torque seat tubes $320_1$ and $320_2$ in order to mitigate the effect of vibrations. It is contemplated that the fastening may be between one side of the receiver 300 and the stabilizing bar 331 if fixedly attached to the passenger seat. The width between the first side 370 and the third side 390 is sufficient for insertion of the line-replaceable SEU 310 having a vertical orientation. The receiver 300 is preferably made of a lightweight non-ferrous conductive metal, such as aluminum, in order to reduce electromagnetic interference "EMI" and mitigate the total system impact on the weight of the aircraft. However, it is contemplated that other types of lightweight metals may be used.

The backplane 350 includes a plurality of communication ports (e.g., ports 351–356 as shown) that route information and power to the line-replaceable SEU 310. It is contemplated however, that any number of communication ports may be used. More specifically, in this embodiment, a first and second communication port 351–352 receives and routes power (e.g., 115V and 12V) propagating through communication lines $340_1$–$340_2$ between passenger seats $210_1$–$210_n$. The third communication port 353 is used to propagate information between the PCU and passenger control handset ("PCH") of the passenger seats $210_1$–$210_n$ and the SEU 250, while the fourth communication port 354 is used to provide power and other information in the event of selecting seat back placement of the display. The fifth and sixth communication ports 355–356 propagate information related to telephony and in-flight entertainment.

The line-replaceable SEU 310 to be removed from the receiver 300 by disconnecting itself from the communication ports 351–356. It is contemplated that the line-replaceable SEU 310 may be replaced without disconnecting power (e.g., conducting a "hot-swap"). Such hot-swapping may be performed, provided chassis ground of the connector (s) for the line-replaceable SEU 310 is last to be disengaged from the communication ports 351–356 and first to be engaged when the line-replaceable SEU 310 is connected to the backplane 350 of the receiver 300.

As shown in FIGS. 5–6, each communication port 351–356 include a pair of multi-pin connectors (e.g., "D-sub" type connectors, Universal Serial Bus, etc.), normally found on the backplanes of conventional personal computers. The connectors protrude from both sides of the backplane 350 so that connectors 357362 are shown in FIG. 6 while their mating connectors are illustrated as dashed lines in FIG. 5. Thus, each communication cable $340_1$, ..., or $340_6$ may be plugged into first connector 357–362, respectively while the line-replaceable SEU 310 may be plugged into their mating connectors as shown in FIG. 4. The pin count of these connectors is dependent on the communication architecture implemented on the aircraft. It is contemplated, however, that other types of connectors may be used, in which these connectors may include electrical and optical fiber interconnects or solely optical fiber interconnects.

While the line-replaceable SEU 310 may be removed and replaced with another line-replaceable SEU, the communication cables $340_1$–$340_6$ would remain in contact with the receiver 300. Thus, only replacement of the line-replaceable SEU 310 is needed instead of a complete disconnection of all communication cables $340_1$–$340_6$. This provides a less labor intensive replacement technique than the current replacement technique described above.

Although not shown, a second embodiment of the SEU may be utilized in which the receiver is mounted to a structural support of the passenger seat to receive the line-replaceable SEU in a horizontal orientation. This is accomplished by attaching the receiver to the pair of torque seat tubes, but leaving the fastener oriented to face the floor of the passenger cabin of the aircraft. This allows a person replacing or installing the line-replaceable SEU access to the fastener.

Another contemplated embodiment of the SEU involves the receiver being mounted to another structural support such as at least one leg of the passenger seat. The third portion of the receiver 300 would be attached to and remain flush with the leg of the passenger seat. This placement still provides access to the fastener and subsequent removal of the line-replaceable SEU.

Figure 7:
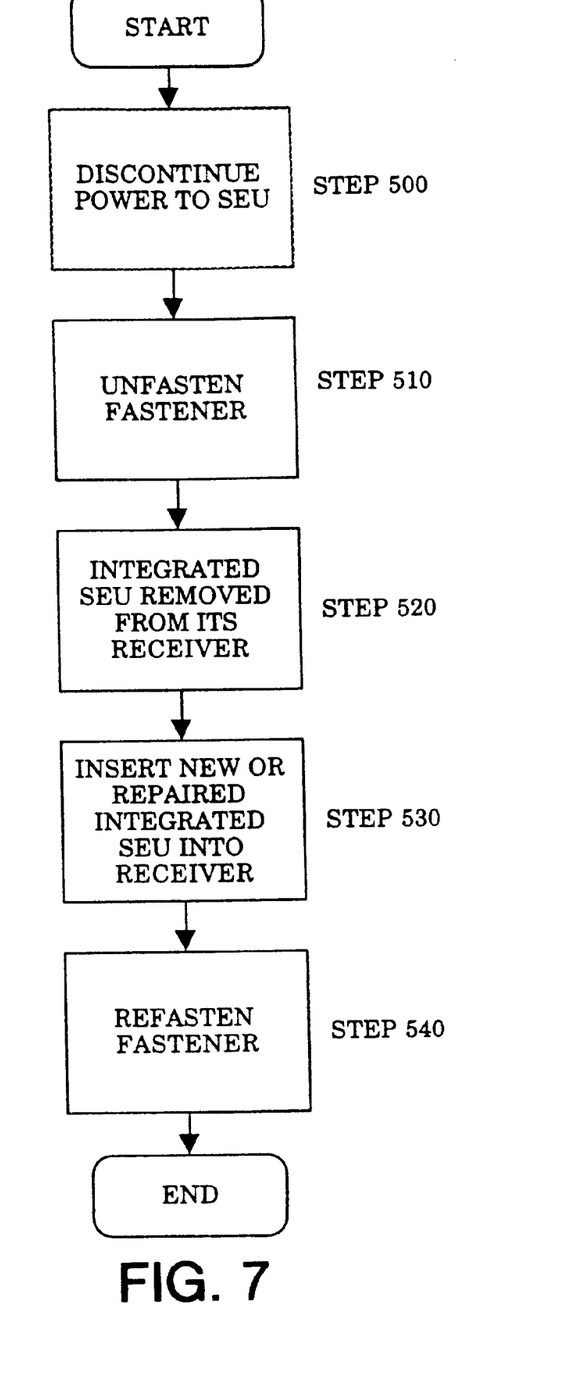
FIG. 7 is a flowchart illustrating the operational steps for removal and installation of a SEU due to the assistance of the present invention.

Referring now to FIG. 7, a flowchart illustrating the operational steps in order to remove a line-replaceable SEU and install another line-replaceable SEU is shown. In step 500, power applied to the SEU is discontinued. As indicated by the dashed lines, this step is optional because the SEU may be capable of being "hot swapped" with power still being applied during removal, provided chassis ground of connectors is designed to be the first part of the connector to be engaged upon connection and last to be disengaged for removal. Next, the fastener situated on the first side of the receiver is unfastened (Step 510). Next, the line-replaceable SEU is pulled in a direction parallel with the floor of the aircraft and away from the backplane of the receiver to complete its removal from the receiver (Step 520). Another line-replaceable SEU (or even the line-replaceable SEU just removed) is appropriately inserted into the receiver to interconnect with the in-line connector mounted on the backplane of the receiver (Step 530). Thereafter, the fastener is refastened ensuring that the line-replaceable SEU is appropriately mated with the in-line connector (Step 540). Subsequently, power may be reapplied to the SEU, if previously disconnected, in order to perform diagnostic tests on the SEU to guarantee that it is operating properly.

The present invention described herein may be designed in many different embodiments and using many different configurations. As discussed herein, the architecture of the SEU is flexible, provided the backplane of the receiver maintains its connection with the communication cables. While the present invention has been described in terms of various embodiments, other embodiments may come to mind to those skilled in the art without departing from the spirit and scope of the present invention. The invention should, therefore, be measured in terms of the claims which follow.

What is claimed is:

1. An in-flight entertainment system comprising:
   at least one communication cable propagating information in digital form; and
   electronic circuitry coupled to the at least one communication cable, the electronic circuitry including
   a removable seat electronic unit, and
   a receiver connected to the at least one communication cable and the seat electronic unit, the receiver is configured to allow the seat electronic unit to be detached without disconnecting the at least one communication cable.

2. The in-flight entertainment system according to claim 1, wherein the seat electronic unit and the receiver are securely fastened together by a latch partially mounted to both a first side of the receiver and a side of the seat electronic unit.

3. The in-flight entertainment system according to claim 1, wherein the receiver is securely supported by at least one torque seat tube of a passenger seat.

4. The in-flight entertainment system according to claim 3, wherein the receiver includes
   a backplane configured to provide an electrical interface between the at least one communication cable and the seat electronic unit; and
   a plurality of sides coupled to the backplane, a first side including a latch means for maintaining the seat electronic unit in close proximity to the receiver, and a second side being attached to the at least one torque seat tube.

5. The in-flight entertainment system according to claim 4, wherein the backplane includes at least one cable connector, the cable connector electrically connecting the at least one communication cable to the seat electronic unit.

6. The in-flight entertainment system according to claim 4, wherein a third side of the plurality of sides is oriented adjacent to a leg of a passenger seat.

7. The in-flight entertainment system according to claim 4, wherein a third of the plurality of sides is placed adjacent to a seat cushion of a passenger seat.

8. The in-flight entertainment system according to claim 1, wherein the seat electronic unit may be removed from the receiver without disrupting power supplied to the receiver through the at least one communication cable.

9. Interconnected to a plurality of communication cables, electronic circuitry comprising:
   a removable seat electronic unit; and
   a receiver coupled to the plurality of communication cables and removably coupled to the seat electronic unit, the receiver to allow the seat electronic unit to be removed without removal of the plurality of communication cables.

10. The electronic circuitry according to claim 9, wherein the receiver is securely attached to at least one torque seat tube of a passenger seat.

11. The electronic circuitry according to claim 10, wherein the receiver includes
   a backplane configured to provide an electrical interface between the plurality of communication cables and the seat electronic unit; and
   a plurality of sides coupled to the backplane, a first side includes a first latch element used in part to secure the seat electronic unit to the receiver, and a second side is attached to the at least one torque seat tube.

12. The electronic circuitry according to claim 11, wherein the backplane includes a plurality of cable connectors, each cable connector electrically connecting one of the plurality of communication cables to the seat electronic unit.

13. The electronic circuitry according to claim 11, wherein a third side of the plurality of sides is oriented adjacent to a leg of a passenger seat.

14. The electronic circuitry according to claim 11, wherein a third side of the plurality of sides is adjacent to a seat cushion of a passenger seat.

15. The electronic circuitry according to claim 9, wherein the electronic unit may be removed from the receiver without disrupting power supplied to the receiver through one of the plurality of communication cables.

16. A receiver adapted for connection to a plurality of communication cables and a removable seat electronic unit of an in-flight entertainment system, the receiver comprising:
   a backplane configured to provide an electrical interface between the plurality of communication cables and the seat electronic unit, the backplane includes a plurality of cable connectors which provide a mechanical and electrical connection with the plurality of communication cables; and
   a plurality of sides coupled to a perimeter of the backplane, the plurality of sides include a first side including a first latch element to maintain the seat electronic unit in close proximity to the receiver.

17. A method for removal and installation of a removable seat electronic unit that controls the propagation of information routed through communication cables to devices associated with a passenger seat, the method comprising:
   electrically disconnecting the seat electronic unit from a receiver while the receiver remains attached to the communication cables;
   inserting the seat electronic unit into the receiver; and
   electrically connecting the seat electronic unit to the receiver.

18. The method according to claim 17, wherein prior to the electrically disconnecting the seat electronics unit, the method further comprises:
   separating a first latch element from a second latch element to unfasten the seat electronic unit from the receiver.

19. The method according to claim 18, wherein after electrically connecting the seat electronics unit, the method further comprises:
   re-fastening the first latch element to the second latch element to secure the seat electronic unit to the receiver.

20. Terminating a communication cable within an aircraft by a first connector and attached to a seat of the aircraft, a seat electronic unit comprising:
   a receiver including the first connector and a second connector coupled to the first connector; and
   electronic circuitry that plugs into the second connector to be connected with the communication cable and unplugs from the second connector while the communication cable remains attached to the first connector.

21. The seat electronic unit according to claim 20, wherein the electronic circuitry is partially inserted within the receiver to plug into the second connector.

22. The seat electronics unit according to claim 20, wherein the receiver is securely supported by at least one torque seat tube of the seat.

23. The seat electronic unit according to claim 20, wherein the receiver includes
   a backplane including the first and second connectors, said backplane to provide an electrical interface between the communication cable and the electronic circuitry; and
   a plurality of sides coupled to the backplane, a first side includes a first latch element used to secure the electronic circuitry to the receiver, and a second side is attached to the at least one torque seat tube.

24. The seat electronics unit according to claim 23, wherein a third side of the plurality of sides is generally oriented in parallel to the first side.

25. The seat electronic unit according to claim 20, wherein the electronic circuitry is unplugged from the second connector while power is still supplied to the first connector.

26. Attached to a support of a seat of an aircraft and providing an interface between a communication cable and a removable seat electronic unit, a receiver comprising a first connector protruding from an exterior surface of a backplane and a second connector coupled to the first connector, the second connector protruding from an interior surface of the backplane and providing an electrical connection for the line-replaceable electronics seat unit.

27. The receiver according to claim 26 further comprising a plurality of sides coupled to a perimeter of the backplane, the plurality of sides partially surrounding the seat electronic unit when connected into the second connector.

28. The receiver according to claim 27, wherein a first side of the plurality of sides includes a first latch element to maintain the seat electronic unit in close proximity to the receiver.

29. A method for installation of a first removable seat electronic unit that interconnects a communication cable to input and output devices associated with a seat of an aircraft, the method comprising:
   providing a receiver that is pre-attached to the seat and includes a first connector coupled to the communication cable and a second connector coupled to the first connector;

inserting the first seat electronic unit into the second connector; and securing the mated relationship between the second connector and the first seat electronic unit.

30. The method according to claim 29, wherein prior to inserting the first seat electronics unit, the method further comprises:

disconnecting a second seat electronic unit from the receiver while the receiver remains attached to the communication cable.

31. The method according to claim 30, wherein prior to disconnecting the second seat electronics unit, the method further comprises:

separating a first latch element from a second latch element to unfasten the second seat electronic unit from the receiver.

32. The method according to claim 31, wherein after the inserting the first seat electronics unit, the method further comprises the step of:

re-fastening the first latch element to the second latch element to secure the first seat electronic unit to the receiver.

33. An in-flight seat-to-seat entertainment system implemented in a mass transit vehicle including a plurality of passenger seats having dedicated peripherals, the in-flight seat-to-seat entertainment system comprising:

connecting means for transferring content and power; and a seat electronic unit coupled to said connecting means, said seat electronic unit including means for propagating said content and power to peripherals associated with the seat electronic unit, and receiver means for allowing said propagating means to be detached therefrom and maintain coupling with said connecting means.

34. A system comprising:

at least one communication cable propagating information in digital form; and electronic circuitry coupled to the at least one communication cable, the electronic circuitry including a removable electronic unit, and a receiver connected to the at least one communication cable and the seat electronic unit, the receiver is configured to allow the seat electronic unit to be detached without disconnecting the at least one communication cable.

35. The system according to claim 34, wherein the electronic unit and the receiver are securely fastened together by a latch partially mounted to both a first side of the receiver and a side of the electronic unit.

36. The system according to claim 34, wherein the receiver includes a backplane configured to provide an electrical interface between the at least one communication cable and the electronic unit; and a plurality of sides coupled to the backplane, a first side including a latch for maintaining the electronic unit in close proximity to the receiver.

37. The system according to claim 36, wherein the backplane includes at least one cable connector, the cable connector electrically connecting the at least one communication cable to the electronic unit.

38. The system according to claim 34, wherein the electronic unit may be removed from the receiver without disrupting power supplied to the receiver through the at least one communication cable.

* * * * *